United States Patent [19]

Lin

[11] Patent Number: 5,469,811

[45] Date of Patent: Nov. 28, 1995

[54] AQUARIUM HAVING LEAK-PROOF BUBBLING PORT

[76] Inventor: Yu-An Lin, No.13, Wen-Ming Lane, Erhlin Chen, Changhua Hsien, Taiwan

[21] Appl. No.: 248,683

[22] Filed: May 25, 1994

[51] Int. Cl.[6] .................................................. A01K 63/00
[52] U.S. Cl. ........................... 119/263; 119/254; 119/269
[58] Field of Search ................................... 119/263, 245, 119/247, 249, 253, 254, 269

[56] References Cited

U.S. PATENT DOCUMENTS

| 3,807,356 | 4/1974 | Pratt | 119/247 |
| 4,196,695 | 4/1980 | Zupo | 119/253 |
| 4,612,876 | 9/1986 | Tigert | 119/253 |
| 4,703,720 | 11/1987 | Shipman et al. | 119/263 |

FOREIGN PATENT DOCUMENTS 810321  3/1937  France ................................. 119/254

Primary Examiner—Todd E. Manahan
Attorney, Agent, or Firm—Bacon & Thomas

[57] ABSTRACT

The present invention relates to an improved leak-proof device for a bubbling port of an aquarium comprising a water tank, a base cover and a base disc, the water tank having a bubbling port on the bottom, and an exhaust outlet setting with a check valve. The base cover has an integrally molded communication connector, and on top of the connector, a check valve. The base disc has an air pump with a connected conduit. With the assembly of these members, air produced from the air pump may enter water tank for bubbling, and because of the check valve and related devices on the water tank and base cover, the bubbling port on the base, of the water tank has double leak-proof effect.

2 Claims, 4 Drawing Sheets

AQUARIUM HAVING LEAK-PROOF BUBBLING PORT

BACKGROUND OF THE INVENTION

The present invention relates to an improved leak-proof device for a bubbling port of an aquarium, comprising a water tank, with a base cover and a base disc. With the special design between the water tank and the base cover, the bubbling port on the bottom of the aquarium thus has a double leak-proof effect. The leak-proof device is designed to be integrally molded with the water tank and base cover so that leak-proof device has a better leak-proof effect.

Because water in an aquarium is not flowing the risk of inadequate oxygen exists. To enable fish to live in healthy conditions, therefore, most aquariums have a bubbling device for air supply. However, because of a junction between the water tank and the bubbling device, water is often found leaking back to the bottom of water tank through the bubbling device.

To improve the aforesaid defects, conventional aquariums are designed with an air conduit extending from an air pump in the base seat of the aquarium and connected to a bubbling port. An intermediate portion of said air conduit further has a greater hollow tube body with a check valve therein to prevent water in the water tank from leaking back to the base seat. Such a design still has following defects:

a. the air conduit between the water tank and the base seat may be mounted by a connection only and water is often found leaking back to the base seat as a result of the junction breaking away; and, b. the air conduit has only one check valve for the prevention of water leaking from the water tank, and the design for leak prevention at a single position is not sufficient.

These and other objects and advantages of the present invention will become apparent to those skilled in the art after considering the following detailed specification together with the accompanying drawings.

DETAILED DESCRIPTION OF THE PREFERRED EMBODIMENT

Figure 1:
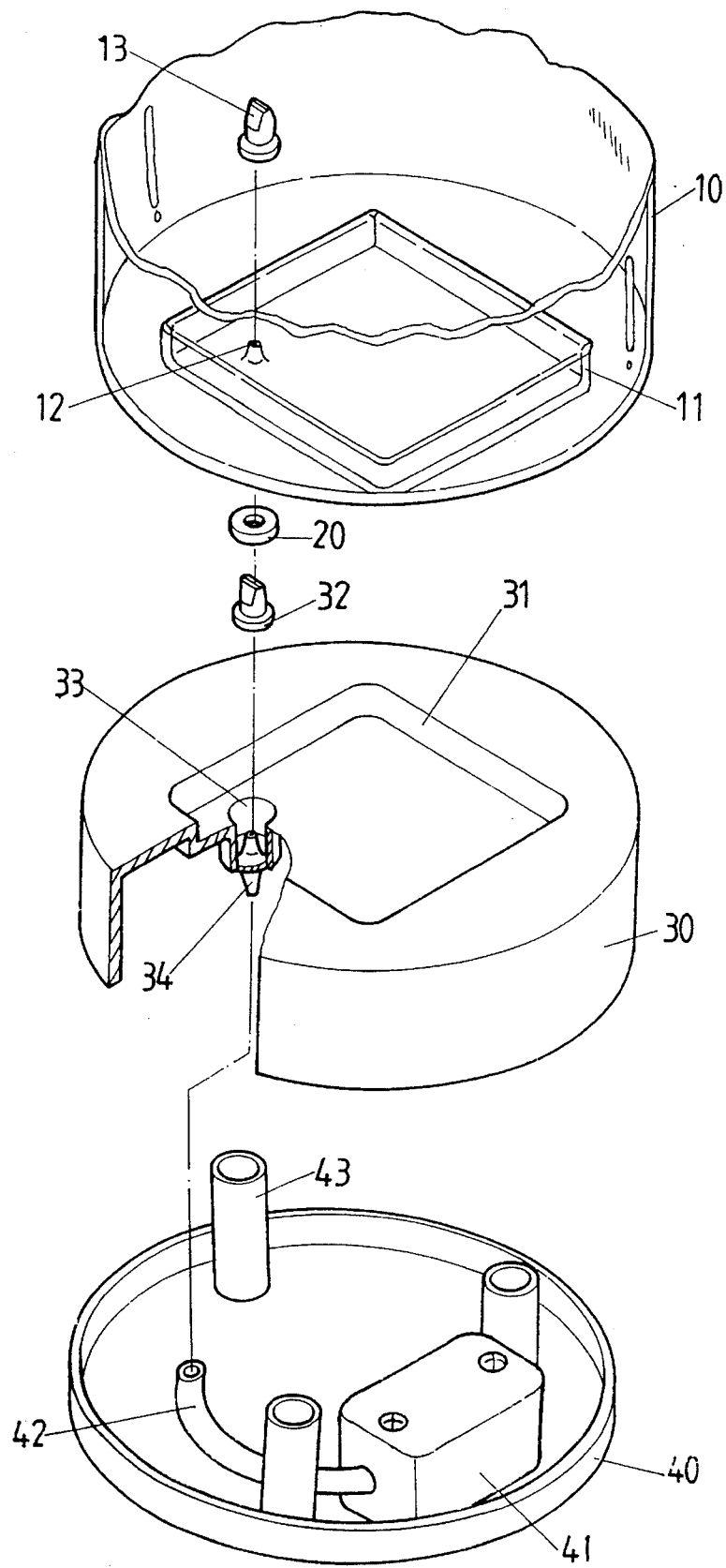
FIG. 1 is an exploded perspective view of the components of the present invention.
Figure 2:
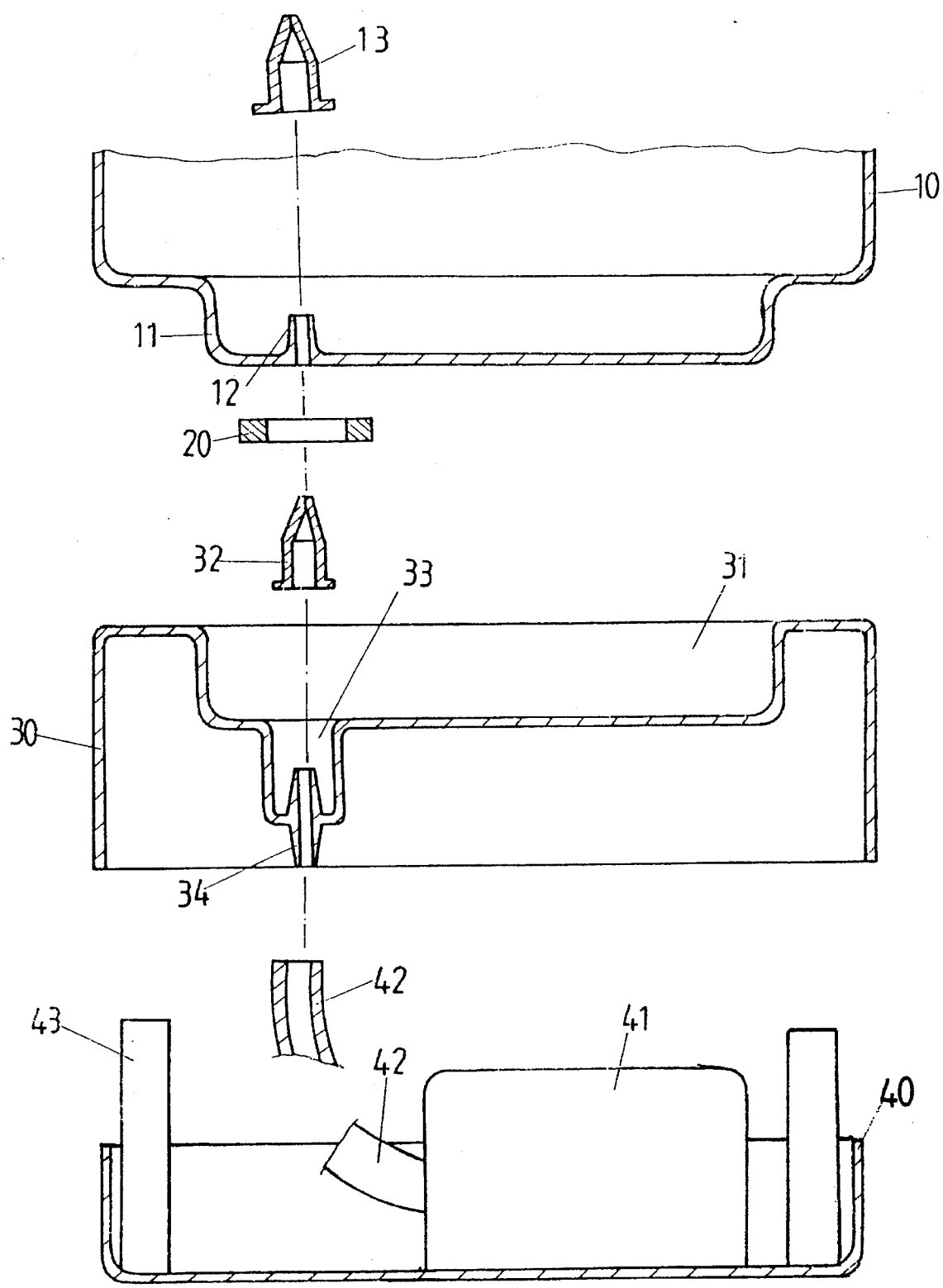
FIG. 2 is an exploded cross-sectional view of the present invention.

Referring to FIGS. 1 and 2, the present invention comprises water tank 10, base cover 30 and base disc 40 wherein said water tank 10 has an insertion slot 11 defined by a recess made on the bottom and said insertion slot 11 has an integrally molded bubbling port 12 with a check valve 13 mounted on a top end of bubbling port 12.

Said base cover 30 is recessed to form a connection slot 31 which is further recessed to include a valve mounting hole 33. A top end of the valve mounting hole 33 has an elastic cushion 20 and an inside with a communication connector 34 integrally molded with base cover 30. Check valve 32 is mounted on top end of said communication connector 34.

Said base disc 40 has an air pump 41 and a conduit 42 extending from air pump 41. A number of struts 43 are made around the base disc 40.

Figure 3:
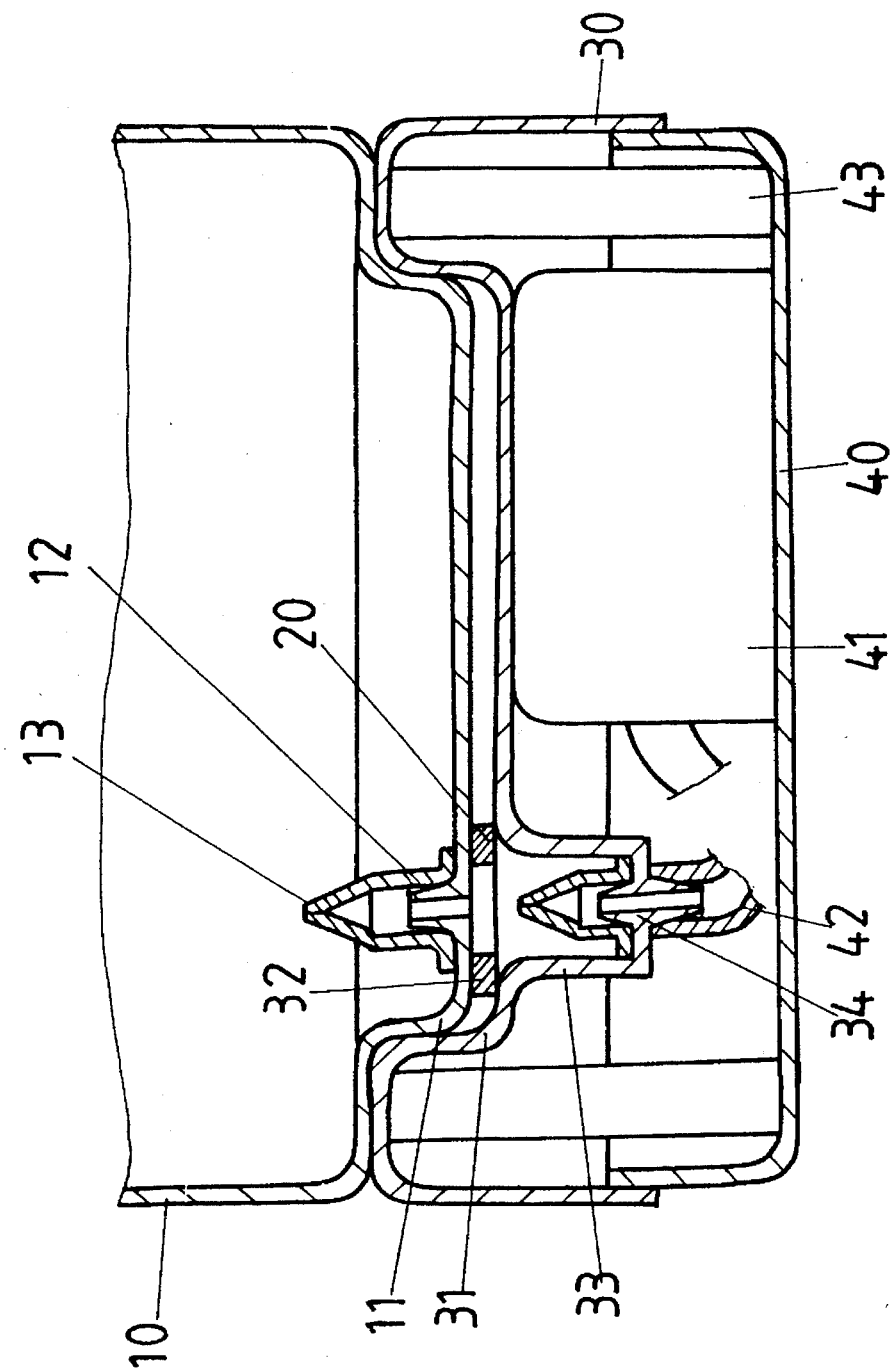
FIG. 3 is a cross-sectional view of the present invention.

Referring to FIG. 3, assembly is carried out by setting the base cover 30 together with the base disc 40 and connecting air conduit 42 from air pump 41 to the communication connector 34 on base cover 30.

Water tank 10 is set together with connection slot 31 of the base cover 30 by means of insertion slot 11 to securely mount water tank 10 on the top of base cover 30. Elastic cushion 20 of connection slot 31 lies tightly on the bottom end of bubbling port 12 of insertion slot 11.

Figure 4:
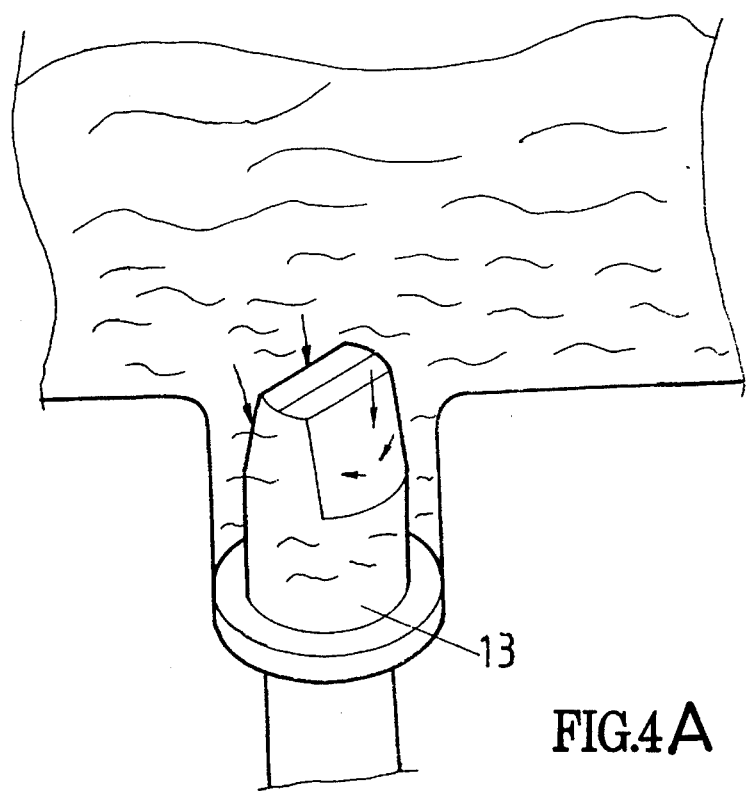
FIGS. 4A and 4B are perspective views showing the action of the check valve of the present invention.
Figure 4:
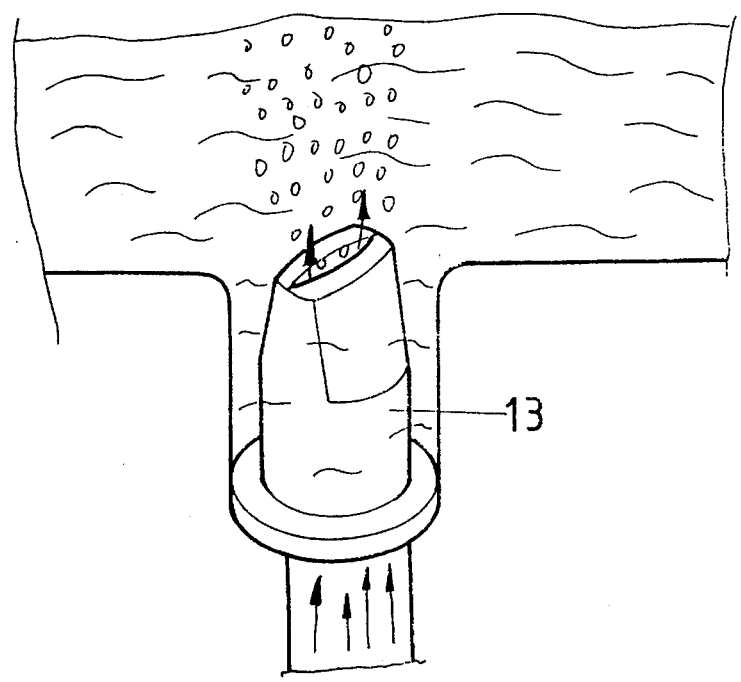

Referring to FIGS. 4A and 4B, check valve 13 is constructed of an elastic body with an opening mount. When not venting it is as shown in FIG. 4A. Water pressure on the top will be imposed on the two bevel sides of check valve 13 to form an air-tight condition on each end of check valve 13 to prohibit water from leaking back to the portion under check valve 13. If there is air passing by check valve 13, as shown in FIG. 4B, the air will force open the port of check valve 13 to let bubbles get out of check valve 13.

Referring to FIG.3, air produced from air pump 41 is diverted to the communication connector 34 by virtue of conduit 42 to enter bubbling port 12 through elastic cushion 20 and to discharge from check valve 13. When there is no air discharged, because bubbling port 12 of water tank 10 and communication connector 34 of base cover 30 have check valves 13, 32 respectively to prevent water in the water tank from leaking back to the base disc, the structure thus has formed a double leak-proof effect to ensure that water in water tank 10 will not leak back to base disc 40. Even if check valve 13 on the top were broken, the check valve 32 on the bottom will protect the conduit 42 connected against breaking away by large water pressure to cause water flooding the floor.

Referring to FIG. 2, recessed insertion slot 11 and bubbling port 12 on the water tank 10, and recessed connection slot 31 on the base cover 30, valve mounting hole 33 and communication connector 34 all are integrally molded so they are very convenient to assembly and become secure and strong after assembly, without risk of breaking away and damage.

I claim:

1. An improved leak-proof aquarium comprising:

a) a base disc having an air pump with an air conduit extending therefrom;

b) a base cover located on the base disc, the base cover having a recessed connection slot, a mounting hole formed in the recessed connection slot, and a connector having a first bubbling port connected to the air conduit;

c) a water tank having an insertion member in the recessed connection slot so as to mount the water tank on the base cover, the water tank having a second bubbling port;

d) an elastic seat located between the water tank and the base cover around the second bubbling port;

e) a first check valve connected to the second bubbling port so as to allow air to pass into the tank and prevent water in the tank from passing through the second bubbling port; and, f) a second check valve connected to the first bubbling port so as to allow air to pass through the first bubbling port and prevent water from the water tank from passing through the first bubbling port.

2. The aquarium of claim 1 wherein the first and second check valves comprise an elastic body having an opening mouth and beveled sides located on opposite sides of the opening mouth whereby water contacting the beveled sides will urge the opening mouth to a closed position.

* * * * *